No. 723,418. PATENTED MAR. 24, 1903.
J. F. STEWARD.
WINDROWING ATTACHMENT FOR MOWING MACHINES.
APPLICATION FILED AUG. 18, 1902.
NO MODEL. 2 SHEETS—SHEET 1.
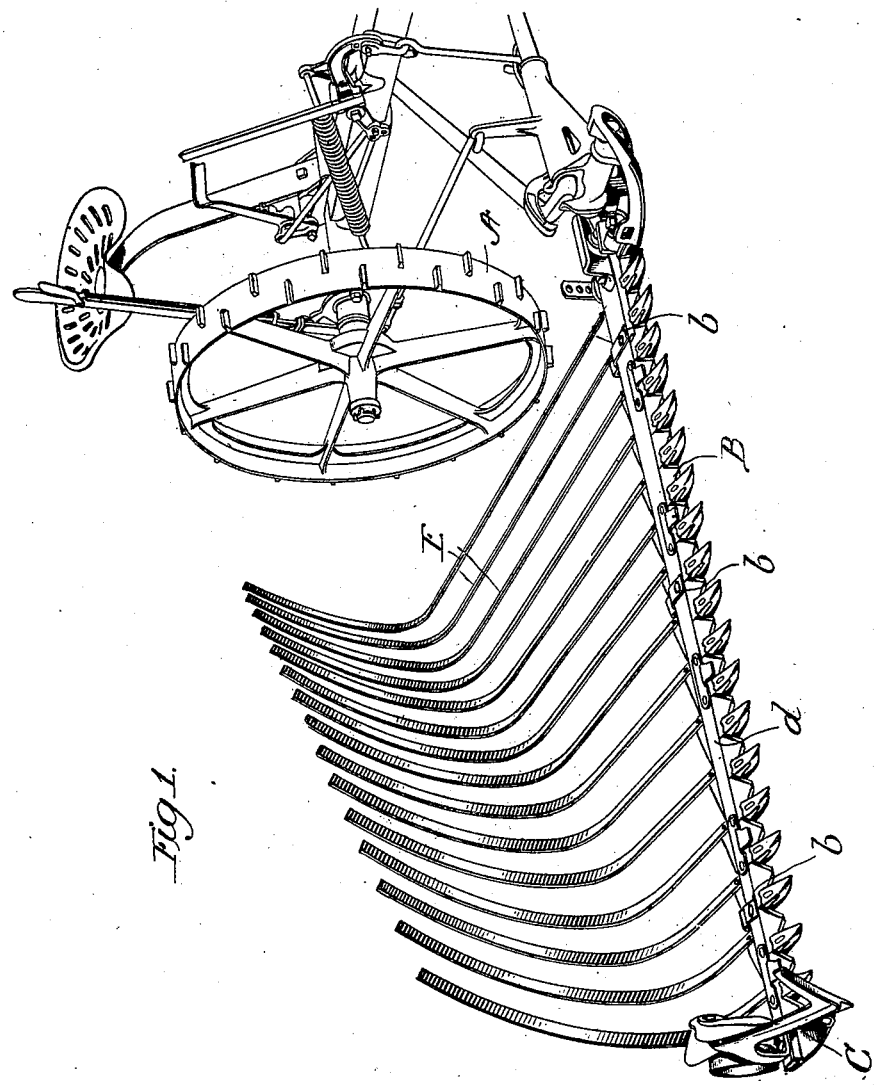

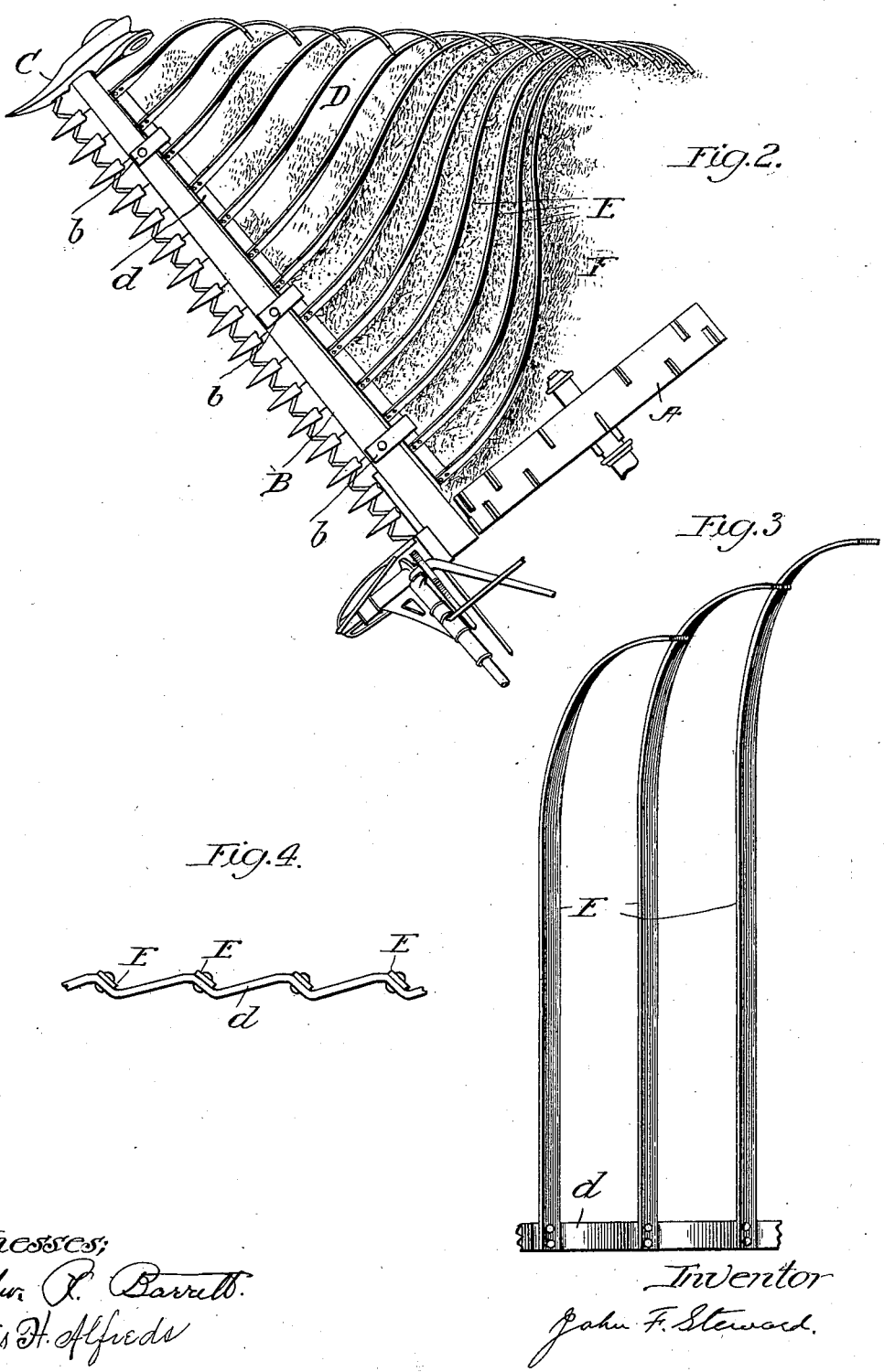

UNITED STATES PATENT OFFICE.

JOHN F. STEWARD, OF CHICAGO, ILLINOIS.

WINDROWING ATTACHMENT FOR MOWING-MACHINES.

SPECIFICATION forming part of Letters Patent No. 723,418, dated March 24, 1903.

Application filed August 18, 1902. Serial No. 120,021. (No model.)

*To all whom it may concern:*

Be it known that I, JOHN F. STEWARD, of Chicago, in the county of Cook and State of Illinois, have invented certain new and useful Improvements in Windrowing Attachments for Mowing-Machines, of which the following is a full description, reference being had to the accompanying drawings, in which—

Figure 1 is a perspective view of the attachment, showing its position on the mowing-machine. Fig. 2 is a plan view of the machine, showing the fingers of the attachment as having yielded laterally by contact with the stubble and rough ground while turning at the corner of a field. Figs. 3 and 4 show teeth and the means by which they are secured to the bar that sustains them.

This device is of the kind which when secured to the rear of the finger-bar receives clover and similar growths, rolls the cut swath, and delivers it behind the mowing-machine in the form of a windrow. Its object is, in part, to provide fingers that may yield, and thus avoid breaking when turning corners, which when set at an angle shall present but a line of contact with the mass that moves over them. I also shape the rear ends of the fingers so that there shall be as little surface as possible to come in contact with the rolling material. Clover for seed may be cut in the morning before the dew is off, as it will dry sufficiently in the windrow; but it has been found that if flat surfaces come in contact with the material when slightly wet it will not roll perfectly. For that reason I present the edges of the fingers to the material being operated upon as much as possible.

A represents one wheel of a mowing-machine, B the cutting apparatus, and C the outer shoe, which are the only parts of a mowing-machine necessary to illustrate the purposes of my invention, its position, and operation.

D is the windrowing device, consisting of the bar $d$, loosely secured by the clips $b$ in rear of the cutting apparatus. To this bar are riveted or otherwise secured the fingers E, that extend rearwardly parallel with the line of advance of the machine and have their rear ends upturned. The lengths vary, as shown in the figures, those nearest the grass end of the cutting apparatus being comparatively short, those in rear of the stubble end of the cutting apparatus being long, and the others ranged between, so that their rear ends are substantially in a line at an angle relative to the cutting apparatus. These fingers consist of a flat bar of iron, preferably about one inch in width and one-eighth of an inch in thickness. I do not wish the rear ends to present flat surfaces to the material being rolled, and hence to avoid this I do not twist the rear ends of the fingers so that their planes shall be on the same line, but leave them as shown in Fig. 3. In short, the planes of the upturned ends are transverse to the general length of the fingers rather than parallel with the diagonal line their ends follow. In order that the fingers may present an edge to the material received by them, I form the bar $d$ as shown in Fig. 4 and rivet or otherwise secure the fingers, as shown. It will be readily understood that if the planes of the fingers were vertical they would yield under the pressure of any obstructions upon the ground, which is represented by the stippling F in Fig. 2, and not break, whereas if lying parallel with the ground they would be likely to be bent edgewise permanently, broken from their bar, or broken somewhere along their length. If fully vertical, they would hold the material received by them higher from the ground than desirable. By placing them at a slight angle, however, I take advantage of the fact that when pressure is applied to them, as in turning a corner, they will be permitted to yield, as shown in Fig. 2, which yielding is due to the fact that the said pressure has a torsional effect, so that, toward their rear ends more particularly, they can yield sidewise to any extent without breaking. The upturned rear ends of the fingers are deflected considerably from vertical in the stubbleward direction; but I do not accomplish this by twisting the fingers, but by securing them to the inclined planes of the bar $d$.

What I claim as my invention, and desire to secure by Letters Patent, is—

1. In a windrowing device for mowing-machines, a finger-bar, a supporting-bar secured to said finger-bar, a series of rearwardly-extending flat fingers gradually lengthening stubbleward and attached to said supporting-bar, and arranged substantially parallel with the line of advance of the machine, the said fingers placed with the flat side thereof at an angle relative to the upper surface of the said finger-bar, substantially as described.

2. A windrowing device for mowing-machines, consisting of a finger-supporting bar having inclined planes along its length, the inclination being in the direction of its length and having secured to said planes flat fingers, said fingers having the inclination of the said planes and extending rearwardly therefrom substantially parallel with the line of advance and having upturned ends, substantially as described.

3. A windrowing device for mowing-machines, consisting of a finger-supporting bar having inclined planes along its length, the inclination being in the direction of its length and having secured to said planes flat fingers, said fingers having the inclination of the said planes and extending rearwardly therefrom substantially parallel with the line of advance, said fingers being of increasing length from the grass end of the cutting apparatus and having upturned ends, substantially as described.

4. A windrowing device for mowing-machines consisting of a series of rearwardly-extending upwardly-turned flat fingers suitably connected to the rear of the cutting apparatus of a mowing-machine, and so inclined as to present the edges of both the rearwardly-extending and upwardly-turned portions thereof to the crop being cut and gathered thereon, substantially as described.

JOHN F. STEWARD.

In presence of—
J. C. WARNES,
TORRIS H. ALFREDS.